United States Patent [19]

Offenbacher

[11] Patent Number: 5,829,838
[45] Date of Patent: Nov. 3, 1998

[54] INTEGRAL AUTOMOTIVE SEATBACK AND HEADREST CUSHION

[75] Inventor: Lon A. Offenbacher, Rochester, Mich.

[73] Assignee: General Motors Corporation, Detroit, Mich.

[21] Appl. No.: 907,977

[22] Filed: Aug. 11, 1997

[51] Int. Cl.⁶ .................................................. A47C 7/36
[52] U.S. Cl. .......................................... 297/408; 297/396
[58] Field of Search ................................. 297/408, 410, 297/391, 396

[56] References Cited

U.S. PATENT DOCUMENTS

| | | | |
|---|---|---|---|
| 2,828,810 | 4/1958 | Barecki et al. | 297/408 X |
| 2,839,125 | 6/1958 | Brandon | 297/408 X |
| 3,224,808 | 12/1965 | Spielman | 297/396 X |
| 3,501,137 | 3/1970 | Burgert | 297/410 X |
| 3,729,228 | 4/1973 | Inoue et al. | 297/396 |
| 4,549,766 | 10/1985 | Nishino | 297/403 |
| 4,856,848 | 8/1989 | O'Sillivan et al. | 297/391 |
| 4,865,388 | 9/1989 | Nemoto | 297/408 X |
| 5,082,326 | 1/1992 | Sekido et al. | 297/408 X |
| 5,378,043 | 1/1995 | Viano et al. | 297/408 |
| 5,464,269 | 11/1995 | Mizelle | 397/408 |
| 5,520,435 | 5/1996 | Fujimoto et al. | 297/408 X |

*Primary Examiner*—Milton Nelson, Jr.
*Attorney, Agent, or Firm*—Patrick M. Griffin

[57] ABSTRACT

An integral seatback frame and headrest frame cushion and cover that accommodates angular and/or upward motion of the headrest relative to the seatback. A lower, primary cushion and integral, upper front flap cover the front of the seatback frame and headrest frame respectively, concealing the gap between the two. A rear flap covers most of the back surface of the headrest frame, and the two flaps are not secured tightly to the surfaces of the headrest frame, but have some internal clearance therefrom. When the headrest frame rocks forward, the two covering flaps travel with it without binding or stretching the cushion material.

3 Claims, 2 Drawing Sheets

5,829,838

INTEGRAL AUTOMOTIVE SEATBACK AND HEADREST CUSHION

TECHNICAL FIELD

This invention relates generally to automotive seat cushions, and specifically to an integral seatback and headrest cushion cover especially designed to accommodate angular and vertical motion of the headrest frame relative to the seatback frame.

BACKGROUND OF THE INVENTION

Automotive front driver and passenger seats have a seatback frame and, often, an upper headrest frame attached to and spaced above the uppermost cross member of the seatback frame. Such headrest frames may be simply fixed, but are sometimes vertically adjustable up and down, at least in a static sense. That is, the headrest frame may be moved up and down as a one time adjustment while the car is immobile, to suit different height occupants, but typically does not move relative to the seatback frame thereafter. Although known, adjustable headrest frames that can be moved angularly back and forth relative to the seatback frame are uncommon. The seatback and headrest frames need cushioning and covering, for both comfort and appearance, which is usually done with a cloth, leather or vinyl covered foam cushion. When the headrest frame is fixed and stationary, as in older car designs, it is relatively simple to cover both frames with an integral cushion fixed securely to both frames, since there is no relative motion between the frames to be accommodated. Examples of fixed frame integral cushions may be seen in U.S. Pat. No. 3,729,228 issued Apr. 24, 1973 to Inoue, et al. and U.S. Pat. No. 4,549,766 issued Oct. 29, 1985 to Nishino. When the headrest is movable for adjustment purposes, however, the headrest cushion and cover is generally made entirely separate from the seatback frame, sometimes with a cushion foamed in place directly over the headrest frame. The space between the top of the seatback frame and the headrest frame and cushion is entirely open, but for a pair of slidable posts that attach the headrest frame to the upper cross member of the seatback frame. This vertical gap between the bottom of the headrest and top of the seatback grows or shrinks, and may even close up completely, as the headrest moves up and down. There is thus no impediment to the relative motion of the two, as could occur if part of an integral cushion bridged or filled the gap. While such seats work well, there is an added expense in separately covering the headrest frame, and the gap between the seatback frame and headrest frame cushions could be considered less aesthetically pleasing than an integral cushion and cover with no visible gap p Recently, a new headrest frame and seatback frame combination has been devised in which the headrest frame is movable other than in a static, adjustment sense. This design is disclosed in co assigned U.S. Pat. No. 5,378,043 issued Jan. 3, 1995 to Viano et al., and is also shown in the FIG. 1 of the subject application. The padded headrest 10, the internal frame of which is not shown in FIG. 1, is dynamically movable relative to the seatback frame 12, both angularly forward and vertically upward, as indicated by the dotted line position in FIG. 1. This dynamic relative motion occurs in response to a rapid, rear impact induced acceleration of the vehicle relative to the seat occupant. The weight of the relatively decelerating occupant pushes into the seatback frame 12 and moves a plate 14 backward. Concurrently, the headrest 10 is pivoted forward and upward about a pivot mechanism 16 associated with the upper cross member 18 of the seatback frame 12. This moves the padded headrest 10 closer to the head of the seat occupant. The same type of totally separate padded covering is used here as with headrests that are merely statically adjustable, with the same processing and aesthetic draw backs noted above.

SUMMARY OF THE INVENTION

The subject invention provides an integral padded cushion to cover both the seatback frame and headrest frame of a seat of the type described above, which can accommodate the relative dynamic motion.

In the preferred embodiment disclosed, a seatback frame with an upper cross member has a headrest frame pivotally attached thereto, with a gap therebetween. The headrest frame can dynamically pivot forward and slightly upwardly relative to the set back frame, under a rapid, sudden vehicle acceleration. The seatback and headrest frames are both covered and padded by a integral, flexible foam cushion of specific design. The integral cushion includes a primary cushion that fits closely over the front surface of the seatback frame, and is essentially fixed to the seatback frame. The primary cushion merges integrally into an upper portion which cushions the headrest frame. Specifically, an integral front flap runs over the front of the headrest frame and into a rear flap covering most of the rear of the headrest frame, but neither flap is fixed to the surfaces of the headrest frame. Instead, there is enough internal clearance between the two flaps that they can shift forward with the moving headrest frame, accommodating its motion without binding or restriction, as the front flap bends relative to the primary cushion. The upper portion of the integral cushion, despite not being fixed to headrest frame directly, attains sufficient locational stability from being integral to the fixed primary cushion and from fitting closely over the sides of the headrest frame.

BRIEF DESCRIPTION OF THE DRAWINGS

These and other features of the invention will appear from the following written description, and from the drawings, in which.

DESCRIPTION OF THE PREFERRED EMBODIMENT

Figure 2:
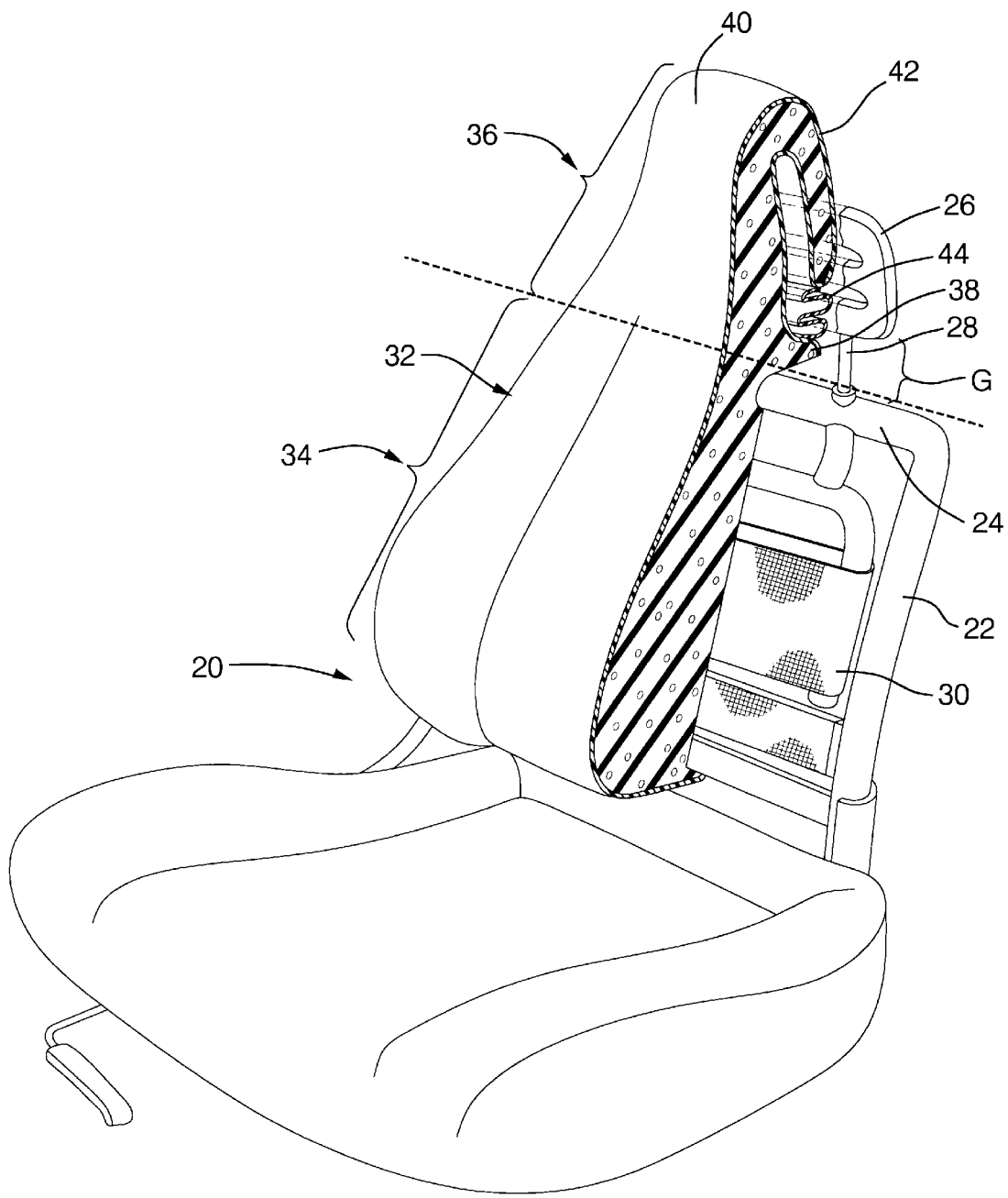
FIG. 2 is a perspective view of an automotive seat having the same basic type of seatback frame and relatively movable headrest frame as shown in FIG. 1, but covered by a partially cut away, integral seatback cushion made according to one preferred embodiment of the invention.

Referring first to FIGS. 2, an automotive seat, indicated generally at 20, has a seatback comprised of seatback frame 22, with generally horizontal upper cross member 24, and a headrest frame 26. The headrest frame 26 is pivoted by a pair of depending posts 28 to and through the cross member 24, creating a gap G between the bottom of headrest frame 26 and cross member 24. The lower ends of the generally vertical posts 28 are attached to an impact target plate 30. When the target plate 30 is pushed backward by a relatively decelerating seat occupant, the headrest frame 26 is concurrently pushed forward, rotating and changing its angle relative to the seatback frame 22. In addition, the posts 28 are adapted to slide up through the cross member 24 as they rotate, acting to push the headrest frame 26 vertically upward to an extent, relative to the upper cross member 24, which would widen the gap G.

Referring next to FIG. 2, a first embodiment of the invention, indicated generally at 32, is an integral seatback cushion designed to cover and cushion both frames 22 and 26, while accommodating the dynamic relative motion between the two described above. The basic seatback cushion 32, though integral, can be conceptualized as being divided into two sections, a lower, primary cushion, indicated generally at 34 and upper, headrest frame cushion, indicated generally at 36. The primary cushion 34 covers at least the front surface of the seatback frame 22, while the headrest frame cushion covers the front and most of the back surface of the headrest frame 26. The primary seatback cushion 34 is a flexible molded foam piece, covered by an outer layer, that is firmly attached to the seatback frame 22 by any suitable means, such as adhesive or mechanical fasteners, so as to be substantially immobile relative thereto. That is, while the primary cushion 34 is compressible, resilient, and generally flexible, it does not shift side to side or up and down appreciably on the seatback frame 22. In addition, a ridge of foam material extends at 38 through the gap G. The upper headrest frame cushion 36 is comprised of an integral front flap 40 that covers the front surface of headrest frame 26, visually concealing the gap, and an integral rear flap 42 that covers most its rear surface, all comprised of the same material as the primary cushion 34, though not as thick. The two flaps 40 and 42 are not fixed securely to the surfaces of the headrest frame 26. Furthermore, there is enough internal clearance between the flaps 40 and 42, in general, to accommodate the motion of the headrest frame 26. Specifically, the axial clearance between the flaps 40 and 42, that is, their separation as measured along the length of the vehicle and perpendicular to the plane of the headrest frame 26, is sufficient to create a fairly close, but not binding, fit over the front and rear surfaces of the headrest frame 26. In addition, there is some vertical clearance between the upper edge of the headrest frame 26 and the inside of the fold between the flaps 40 and 42. Finally, the side edges of the internal cavity between the flaps 40 and 42 make a close and fairly tight fit down over the sides of the headrest frame 26. Also, in the first embodiment 32 shown, a bellows like fabric section 44 connects the lower edge of the rear flap 42 to the foam ridge 38. Given this relative sizing of the flaps 40 and 42 compared to the headrest frame 26, the seat 20 can operate as described next.

Figure 1:
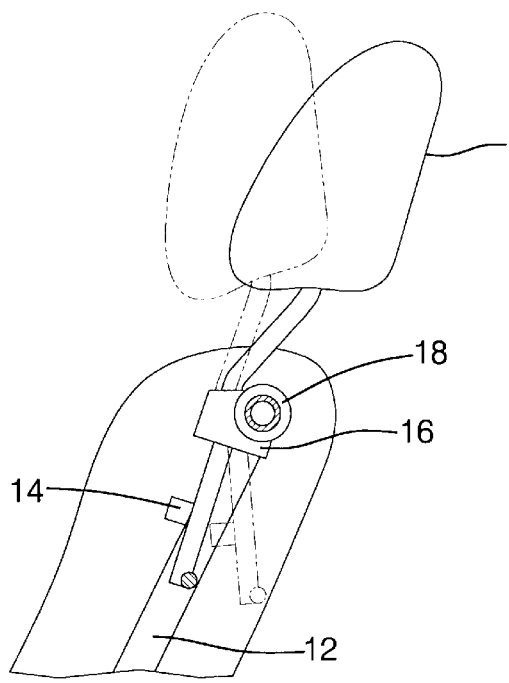
FIG. 1 is a side view of the top of the dynamically movable seatback frame and headrest frame as described above, with a prior art type of separate cushioning.
Figure 3:
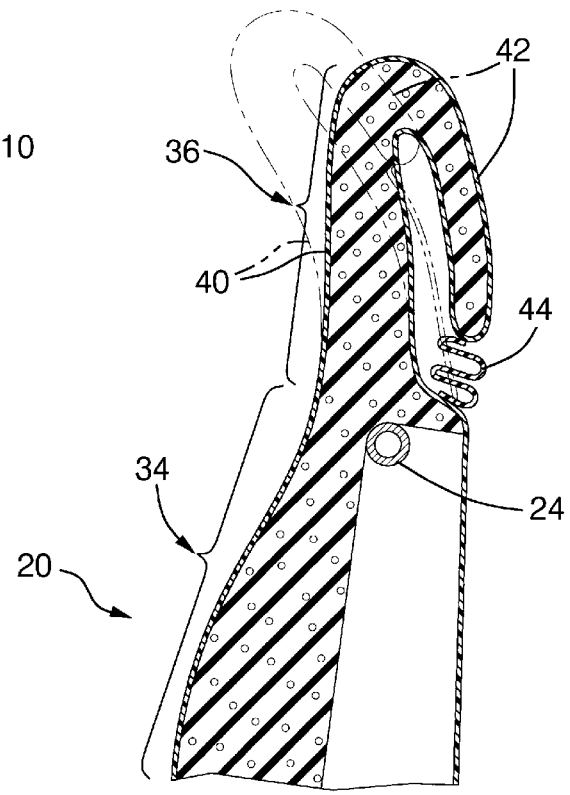
FIG. 3 is a side view of the cushion embodiment of FIG. 2, showing a moved position thereof in dotted lines.

Referring next to FIG. 3, during static operation of the seat 20, headrest frame cushion 36 attains its stability from both its continuous, integral juncture of the front flap 40 to the primary cushion and from the close fit of the flaps 40 and 42 over the sides of the headrest frame 26. Forces tending to sift the front flap 40 side to side would be well resisted, and, normally, no forces would tend to move it up, down or back and forth appreciably. However, when the dynamic forces described above act on the seatback frame 22, the headrest frame 26 experiences both a forward, angular rocking or pivoting, as well as a slight upward translation, relative to the seatback frame upper cross member 24. The headrest frame 26 is not shown, however, so as to better illustrate the internal cavity between the flaps 40 and 42. The headrest frame cushion 36 basically travels along with the headrest frame 26, closely, but without binding or interference. More specifically, the front flap 40 bends freely forward about its live hinge juncture to the primary cushion 34, as shown by the dotted line position. Since the inner surfaces of the flaps 40 and 42 are not fixed to the front and rear surfaces of the headrest frame 26, they slide freely therealong without stretching or binding as this rocking and bending occurs. Concurrently, the top edge of the headrest frame 26, to the extent that it moves up and away from the upper cross member 24, has enough vertical clearance within the internal cavity between the two flaps 40 and 42 not to bind, although it can, if it does make internal contact at the top edge, stretch out the internal cavity to an extent, along with the flaps 40 and 42, which are inherently resilient. At the same time, the bellows section 44 can stretch out freely, although it is shown in only its unstretched condition.

Figure 4:
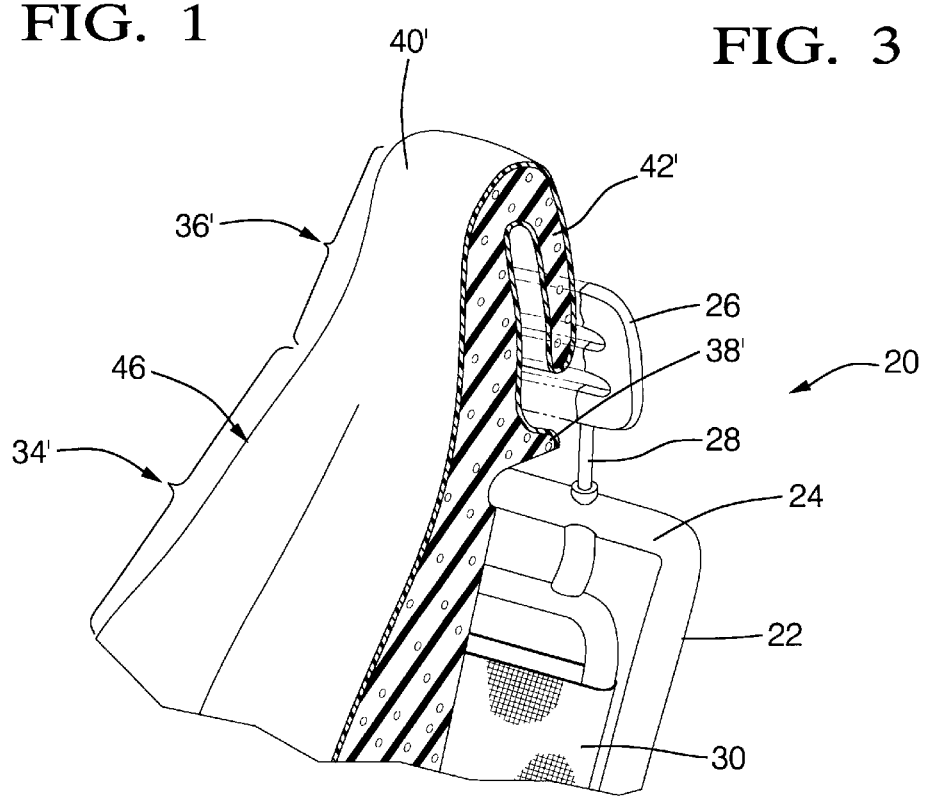
FIG. 4 is a cut away perspective view of a second preferred embodiment of the invention.

Referring finally to FIG. 4, the same seat 20 with a second embodiment of a seatback cushion made according to the invention is indicated generally at 46. It fits to and over the same seat frame components, indicated with the same numbers. It also incorporates the same basic cushion portions with the same materials, thicknesses and relative sizes, indicated by the same number primed. The embodiment 46 is simpler in not incorporating the bellows fabric section between the lower edge of its rear flap 42' and the foam ridge 38' This area is simply left open and uncovered. The same basic accommodation of the dynamic motion of the headrest frame 26 is achieved.

Variations of the disclosed embodiments could be made. The basic design shown could accommodate a similar headrest motion that was only for adjustment purposes, although the seat shown has dynamic motion. The headrest frame cushion 36 could be integrated to the primary cushion 34 not merely by making them part of one continuous foam piece, but of two initially separate pieces joined together at a visible hinge like juncture. This could create enhanced forward flexibility of the front flap 40 relative to the primary cushion 34, in the case of more rigid foam cushion materials, and could also create a visual distinction between the two basic cushion parts, if desired. The very simplest form would be a visually indistinct primary cushion 34 and front flap 40 as shown, however, and most foam materials should be significantly flexible that an integral juncture would be flexible enough. In a case where the motion of the headrest involved no appreciable upward motion, then the vertical component of the internal clearance between the flaps 40 and 42 could be smaller or even negligible. In the case of a seatback that adjusted for height and moved vertically upward more, the vertical clearance could be greater. Therefore, it will be understood that it is not intended to limit the invention to just the embodiments shown.

I claim:

1. In an automotive seat having a seat back frame with an upper cross member and a head rest frame attached to and spaced above said cross member that is angularly movable, relative to said seat back frame, an integral seat back cushion to cover both frames, comprising;

a primary cushion sized to fit closely over at least the front of said seat back frame and substantially immovably fixed thereto, and, a head rest frame cushion extending integrally upwardly from said primary cushion at a flexible juncture and sized to fit freely over the front and at least a portion of the rear surface of said head rest frame without being fixed to said headrest frame and with sufficient internal clearance to accommodate said relative angular movement between said seat back frame and head rest frame as said flexible juncture bends by sliding freely along the front and rear surface of said headrest frame without stretching or binding.

2. In an automotive seat having a seat back frame with an upper cross member and a head rest frame attached to and spaced above said cross member that is angularly movable, relative to said seat back frame, an integral seat back cushion to cover both frames, comprising;

a primary cushion sized to fit closely over the front of said seat back frame and substantially immovably fixed to said seat back frame, and, a head rest frame cushion with a front flap integrally and flexibly connected to said primary cushion and an integral rear flap substantially covering the rear surface of said head rest frame without being fixed to said headrest frame and with sufficient internal clearance between said front and rear flaps to accommodate said relative angular movement between said seat back frame and head rest frame by sliding freely along the front and rear surface of said headrest frame without stretching or binding as said front flap bends relative to said primary cushion.

3. In an automotive seat having a seat back frame with an upper cross member and a head rest frame attached to and spaced above said cross member that is angularly and upwardly movable, relative to said seat back frame, an integral seat back cushion to cover both frames, comprising;

a flexible foam primary cushion sized to fit closely over the front of said seat back frame and substantially immovably fixed to said seat back frame, and, a flexible foam head rest cushion with a front flap integral to said primary cushion and an integral rear flap substantially covering the rear surface of said head rest frame without being fixed to said headrest frame and with sufficient axial and vertical clearance between said front and rear flaps to accommodate said relative angular and upward movement between said seat back frame and head rest frame by sliding freely along the front and rear surface of said headrest frame without stretching or binding as said front flap bends relative to said primary cushion.

\* \* \* \* \*